May 24, 1938.  H. FILIPPI  2,118,552
BRICK CUTTING MACHINE
Filed March 12, 1937  2 Sheets-Sheet 2
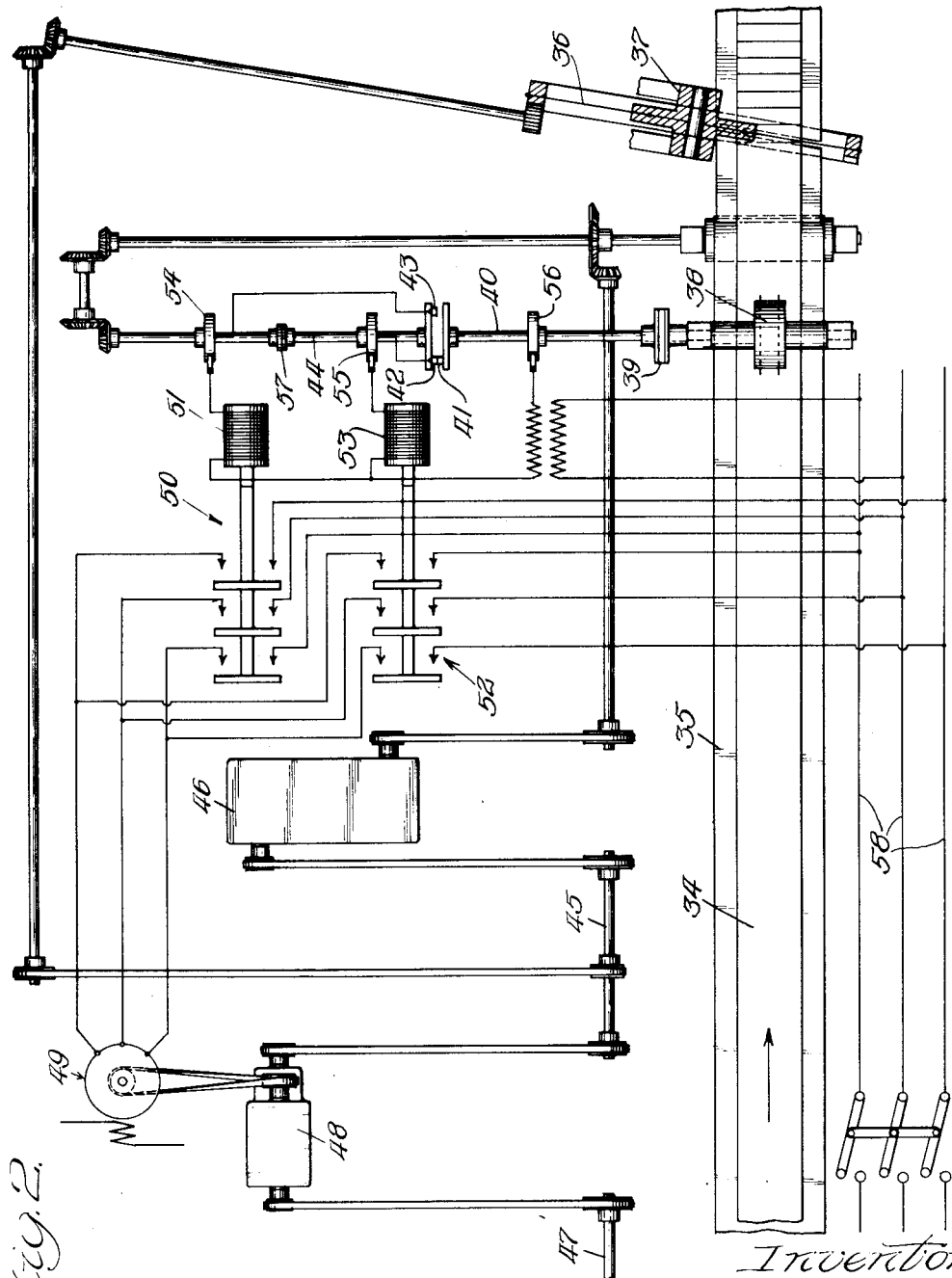
Inventor:
Hugo Filippi,
By Dynrforth, Lee, Chritton & Wiles,
Attys.

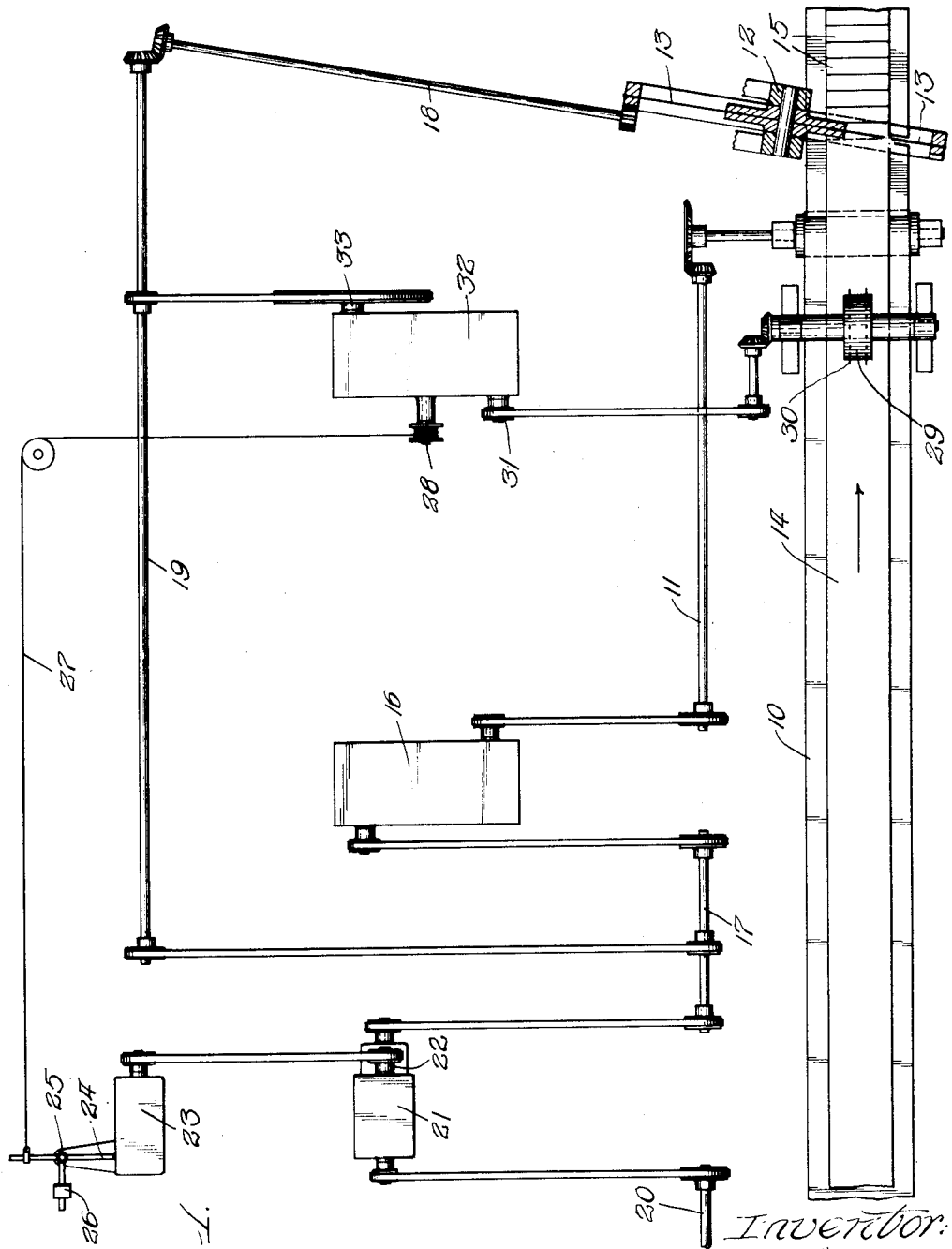

Patented May 24, 1938

2,118,552

UNITED STATES PATENT OFFICE 2,118,552

BRICK CUTTING MACHINE

Hugo Filippi, Chicago, Ill., assignor to Illinois Brick Company, a corporation of Illinois Application March 12, 1937, Serial No. 130,573

12 Claims. (Cl. 25—109)

This invention relates to a brick cutting machine, and more particularly to means for synchronizing the speed of the cutter with the movement of a strip of clay or other plastic material. One feature of this invention is that it automatically compensates for variations in the velocity of a moving strip of plastic material by similarly varying the speed of a cutter operatively associated therewith; another feature of this invention is that despite variations in the consistency and velocity of the strip of material being cut, blocks of a substantially constant width are turned out by the machine; still another feature of this invention is that it permits adjustment of the cutting intervals or width of the finished blocks; other features and advantages of this invention will be apparent from the following specification and the drawings, in which:

Figure 1 is a schematic view of one embodiment of this invention; and Fig. 2 is a schematic view of another modification of this invention.

It is frequently desirable to cut a strip of plastic material into blocks or sections with a flying shears or rotating cutter while the strip is moving. This is the general method, for example, for cutting clay blocks subsequently cured and fired into bricks. A cutter, usually of the rotating type, has a moving strip of clay fed to it by a conveyor and the rotation of the cutter is coordinated with the movement of the strip to cut it at intervals and turn out rectangular blocks of the desired width. It has heretofore been known in the art to coordinate the speed of the cutter with the movement of the conveyor, so that if the strip always moved at the conveyor speed the resultant blocks would be of constant width. It has been found, however, that variations in the consistency of the clay cause variations in the velocity of the strip, and that sometimes the actual velocity of the strip varies as much as fifteen percent from that of the conveyor. The resultant blocks or bricks turned out by the cutter would therefore vary up to this amount in width, a very undesirable result.

The present invention provides a cutter and conveyor in accordance with conventional practice. Variable speed driving means is provided for these two devices, however, and a follower or rotating member is driven by the strip and, through appropriate means, causes variations in the speed of the driving means to synchronize it with the speed of the strip. That is, if the strip of clay begins to slip on the conveyor and is running ten percent slower than the actual conveyor speed the rotating member in contact with the strip actuates the variable speed mechanism to reduce the cutter and conveyor speed to that of the strip. Thus the intervals at which the strip is cut are synchronized with the movement, so that the resultant blocks are of constant width.

In the particular embodiment of this invention illustrated herewith in Fig. 1 a belt conveyor 10 is driven from a transmission shaft 11. A rotating cutter 12 is shown operatively associated with the conveyor and having cutter wires 13 adapted to cut the strip 14 of moving clay at the desired intervals to form rectangular blocks 15 from which the finished bricks are made. The operation of this conveyor and cutter is more fully described and illustrated in my Patent No. 2,037,856, issued April 21, 1936. The clay strip 14 is fed to the conveyor belt 10 continuously by a brick machine of conventional type, not here shown, which extrudes the clay through an opening, corresponding to the width and height of the strip upon the conveyor belt. It has been found that the consistency of the strip and the speed with which it is extruded varies somewhat from the conveyor speed.

The transmission shaft 11 is here shown operatively connected to a manually variable transmission or speed changing device 16, in turn connected to the shaft 17. The transmission 16 is normally set at a one-to-one ratio, and when in this ratio the cutting intervals are so spaced that bricks of standard size are produced. It will be noted that the cutter 12 is driven through transmission shafts 18 and 19 by the shaft 17, so that the speed of the cutter is coordinated with the speed of the conveyor, and manual variations in the transmission 16 will serve to change the spacing or width of the cutting intervals to make bricks of somewhat different size where that is required.

The shaft 17 is here shown as belt driven from a shaft 20 connected to a prime mover, not here shown, through a variable speed driving means or transmission 21. This transmission is of the continuously variable type so that any desired driving relationship, within twenty or twenty-five percent above and below normal, may exist between the shaft 20 and the shaft 17. This transmission 21, in the particular embodiment of this invention operated by me and herewith disclosed, is of the variable diameter pulley type. The diameter of the pulley, and thus the drive ratio of the transmission, is varied by rotation of the control means 22, which is here shown as connected to a fluid motor 23. Control means for the control motor 23 is here shown as a lever 24 pivoted at 25, weighted by the adjustable weight 26 to bias the lower end of the lever toward the right, and connected by the cord 27 to a rotatable shaft 28 to enable the lower end of the lever to be pulled to the left. Motion of the lever one way causes the control motor 23, through the means 22, to vary the diameter of the pulley within the transmission 21 one way, and opposite movement of the lever, effected by the rotatable member 28, causes opposite variation in the diameter of the pulley in the variable speed transmission 21.

The rotating member 29 is here shown as driven by the moving strip of clay 14, making non-slip contact therewith through the points or projections 30. This rotating member, through appropriate means, drives one shaft 31 of a differential 32. The cooperating or opposite shaft 33 of the differential is driven from the shaft 19 which drives the cutter. Thus one shaft rotates at a predetermined ratio with respect to the cutter and the other shaft in a predetermined ratio with respect to the rotatable member 29 driven by the moving strip which is to be cut. These ratios are so chosen that the shafts 31 and 33 rotate at the same speed while the strip is synchronized with the cutter. As long as this condition is maintained the rotatable member or shaft 20, of course, does not move. As soon as the plastic strip gets out of step, however, the shaft 31 rotates at a speed greater than or less than the shaft 33, and the difference causes the central member 28 to rotate and thus effect operation of the control motor 23. This in turn varies the variable speed transmission 21 to either slow down or increase the speed of the shaft 17 until the cutter and conveyor are synchronized with the speed of the strip. As soon as this occurs the two shafts 31 and 33 again rotate at the same velocity, the member 28 no longer rotates, and the control motor stops further variation of the transmission 21. The driving mechanism is thus actuated by variations in the velocity of the moving strip 14 for similarly varying the action or speed of the cutter 12 to maintain the intervals at which the strip is cut substantially constant despite variations in the velocity of the strip.

In the particular embodiment of this invention illustrated in Fig. 2, the strip 34 is similarly carried by a conveyor 35 and cut at desired intervals by the wires 36 of the rotatable cutter 37. The rotatable member 38 is driven by and in accordance with the movement of the strip 34 and through a clutch 39 drives the shaft 40. The shaft 40 has on the end thereof a contact 41 adapted to contact the contact 42 or the contact 43 carried on a shaft 44, or to lie between and out of contact with each of the last-mentioned contacts in accordance with the relative rotation of the shafts 40 and 44. The shaft 44 is driven through appropriate means from the driving means for the conveyor 35. Again both the conveyor and cutter are driven from a single shaft 45, the cutter being directly driven and the conveyor through a manually variable transmission 46. The shaft 45 is also driven from the shaft 47 of a prime mover through the continuously variable speed driving means or transmission 48. A three phase reversible electric motor 49 is here shown as belted to the control means of a variable speed device 48. A relay 50 is provided with an energizing coil 51, and a relay 52 with an energizing coil 53. These two energizing coils are operatively connected at one end of each, through slip rings 54 and 55, to the contacts 43 and 42 respectively. The other energizing lead is connected through a slip ring 56 to the contact 41, so that when the contact 41 closes with the contact 42 the coil 53 is energized to close the relay 52 and actuate the electric motor 49 in one direction to vary the ratio of the transmission 48; when the contact 41 closes with the contact 43, on the other hand, the coil 51 is energized to close the relay 50 and rotate the motor 49 in the other direction to vary the transmission ratio oppositely. When the speed of the moving strip is properly synchronized with the cutter, the contact 41 floats between and out of contact with either 42 or 43, as soon as shafts 40 and 44 are rotating at the same speed, and thus the electric motor is not energized and the transmission ratio remains fixed. The clutches 39 and 57 are provided to permit the shafts 40 and 44 to slip somewhat with respect to their driving means, so that if the moving strip gets too far out of synchronization with the cutter the contact points will not be torn loose from their shafts by excessive pressure. The motor 49 may be any reversible motor, being here shown as a three phase motor connected to a three phase source of current 58 in such manner that closing the one relay energizes the armature of the motor to cause rotation in one direction while closing of the other relay causes rotation in the other direction.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

I claim:

1. Apparatus of the character described for cutting a strip of plastic material, including: means for moving said strip of material; a stationary rotary cutter for cutting said moving strip at desired intervals; and means for synchronizing the speed of rotation of said cutter with movement of said strip to maintain said intervals substantially constant despite variations in the rate of movement of said plastic strip.

2. Apparatus of the character described for cutting a strip of plastic material, including: means for moving said strip of material; a stationary rotary cutter for cutting said moving strip at desired intervals; and means actuated by said moving strip for synchronizing the speed of rotation of said cutter with movement of said strip to maintain said intervals substantially constant despite variations in the rate of movement of said plastic strip.

3. Apparatus of the character described for cutting a strip of plastic material moving with varying velocity, including: a stationary rotary cutter for cutting said moving strip at desired intervals, said strip moving with respect to the cutter during such cutting; and means actuated by variation in the velocity of said strip for similarly varying the speed of rotation of said cutter to maintain said intervals substantially constant despite said variations in the velocity.

4. Apparatus of the character described for cutting a strip of plastic material moving with varying velocity, including: a conveyor for said strip; a stationary rotary cutter operatively associated with said conveyor for cutting said moving strip at desired intervals; and means actuated by variation in the velocity of said strip for similarly varying the speed of rotation of said cutter to maintain said intervals substantially constant despite said variations in the velocity, said means including a rotating member driven by movement of said strip.

5. Apparatus of the character described for cutting a strip of plastic material moving with varying velocity, including: a stationary rotary cutter for cutting said moving strip at desired intervals; variable speed driving means for rotating said cutter; and means for varying the speed of said driving means by and in accordance with variations in the velocity of said moving strip.

6. Apparatus of the character claimed in claim 5, wherein said last-mentioned means includes a rotating member driven by movement of said strip.

7. Apparatus of the character described for cutting a strip of plastic material, including: a conveyor for moving said strip; means for continuously supplying the strip of plastic material to said conveyor; a stationary rotary cutter operatively associated with said conveyor for cutting said moving strip at desired intervals, said strip moving with respect to the cutter during such cutting; variable speed driving means for said cutter and conveyor; and means for varying the speed of said driving means by and in accordance with variations in the velocity of said moving strip.

8. Apparatus of the character claimed in claim 7, wherein said last-mentioned means comprises a rotating member driven by said moving strip and a device having a connection to the driving means for said cutter and to said rotating member.

9. Apparatus of the character described for cutting a strip of plastic material, including: a conveyor for moving said strip; means for continuously supplying the strip of plastic material to said conveyor; a stationary rotary cutter operatively associated with said conveyor for cutting said moving strip at desired intervals; variable speed driving means for said cutter; a rotating member driven by movement of said strip; and a differential operatively connected to said cutter and said rotating member and effective for varying the speed of said driving means in accordance with variations in the velocity of said moving strip.

10. Apparatus of the character described for cutting a strip of plastic material, including: a conveyor for moving said strip; means for continuously supplying the strip of plastic material to said conveyor; a stationary rotary cutter operatively associated with said conveyor for cutting said moving strip at desired intervals; variable speed driving means for said cutter, said means including a variable transmission; a rotating member driven by movement of said strip; motor means for varying the ratio of said transmission; and a differential operatively connected to said cutter and said rotating member and controlling operation of said motor to vary the speed of said driving means in accordance with variations in the velocity of said moving strip.

11. Apparatus of the character described for cutting a strip of plastic material, including: a conveyor for moving said strip; means for continuously supplying the strip of plastic material to said conveyor; a stationary rotary cutter operatively associated with said conveyor for cutting said moving strip at desired intervals; variable speed driving means for said cutter, said means including a variable transmission; a rotating member driven by movement of said strip; motor means for varying the ratio of said transmission; and a circuit for controlling said motor means, said circuit having contacts adapted to be closed by and in accordance with variations in the velocity of said moving strip, whereby said cutter is synchronized with movement of said strip.

12. Apparatus of the character described for cutting a strip of plastic material, including: a conveyor for moving said strip; means for continuously supplying the strip of plastic material to said conveyor; a stationary rotating cutter operatively associated with said conveyor for cutting said moving strip at desired intervals, said strip moving with respect to the cutter during such cutting; variable speed driving means for rotating said cutter, said means including a variable transmission; an electric motor for varying the ratio of said transmission; a circuit adapted to be completed when said strip is moving faster than a desired speed with relation to said cutter, whereby said motor is energized to vary said transmission and increase the speed of said cutter; and a second circuit adapted to be closed when the speed of said strip is slower than the desired speed with relation to said cutter, whereby said motor is energized to vary said transmission and slow down said cutter.

HUGO FILIPPI.